US011146464B2

(12) United States Patent  
Agarwal et al.

(10) Patent No.: US 11,146,464 B2  
(45) Date of Patent: Oct. 12, 2021

(54) SYSTEMS AND METHODS FOR ENABLING INTER-AGENT MULTICAST DOMAIN NAME SYSTEM CLIENT ROAMING IN WIDE AREA NETWORK

(71) Applicant: Cisco Technology, Inc., San Jose, CA (US)

(72) Inventors: Saurabh Agarwal, Santa Clara, CA (US); Rahul Kachalia, Cary, NC (US); Ankur Bhargava, Pleasanton, CA (US); Manoj Narayan, Fremont, CA (US); Saiprasad Muchala, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/867,882

(22) Filed: May 6, 2020

(65) Prior Publication Data

US 2020/0267061 A1    Aug. 20, 2020

Related U.S. Application Data

(63) Continuation of application No. 15/845,682, filed on Dec. 18, 2017, now Pat. No. 10,659,319.

(51) Int. Cl.

| G06F 13/00 | (2006.01) |
| H04L 12/24 | (2006.01) |
| G06F 16/27 | (2019.01) |
| G06F 16/23 | (2019.01) |
| H04L 29/12 | (2006.01) |

(52) U.S. Cl.
CPC ...... *H04L 41/5058* (2013.01); *G06F 16/2379* (2019.01); *G06F 16/27* (2019.01); *H04L 61/1511* (2013.01); *H04L 61/1541* (2013.01); *H04L 61/6022* (2013.01)

(58) Field of Classification Search
CPC ............. H04L 41/5058; H04L 61/1541; H04L 61/1511; H04L 61/6022; G06F 16/2379; G06F 16/27
USPC ................................ 709/224, 223, 202, 203
See application file for complete search history.

(56) References Cited

U.S. PATENT DOCUMENTS

| 7,921,189 B2* | 4/2011 | Kapoor | H04L 67/306 |
| | | | 709/220 |
| 9,552,587 B2* | 1/2017 | Naqvi | G06Q 30/0269 |
| 9,560,050 B2* | 1/2017 | Chien | H04L 63/101 |
| 9,866,550 B2* | 1/2018 | Chien | H04W 12/06 |
| 10,355,916 B2 | 7/2019 | Smith et al. | |
| 10,390,289 B2* | 8/2019 | Naqvi | G06Q 30/0269 |
| 10,440,010 B2* | 10/2019 | Chien | H04L 63/083 |
| 10,614,473 B2* | 4/2020 | Naqvi | G06Q 30/0205 |
| 10,659,319 B2* | 5/2020 | Agarwal | H04L 41/5058 |

(Continued)

*Primary Examiner* — Kenneth R Coulter  
(74) *Attorney, Agent, or Firm* — Polsinelli (57) ABSTRACT

Systems, methods, and computer-readable media for implementing roaming services utilizing zero-configuration networking over a wide area network. Disclosed are systems, methods, and computer-readable storage media for implementing zero-configuration networking over a wide area network by utilizing agents, application programming interfaces (API), and a controller. The controller can implement policies for communication between the agents and APIs, enabling zero-configuration network.

20 Claims, 6 Drawing Sheets

(56) References Cited

U.S. PATENT DOCUMENTS

| | | | |
|---|---|---|---|
| 2008/0120362 A1* | 5/2008 | Kapoor | H04L 67/306 709/203 |
| 2016/0072804 A1* | 3/2016 | Chien | H04L 67/16 726/4 |
| 2017/0126656 A1* | 5/2017 | Chien | H04L 63/101 |
| 2018/0091361 A1 | 3/2018 | Smith et al. | |
| 2018/0124038 A1* | 5/2018 | Chien | H04W 12/06 |
| 2019/0174397 A1* | 6/2019 | Naqvi | G06Q 30/0631 |

\* cited by examiner

FIG. 6 ional Ser. No. 15/845,682 filed on Dec. 18, 2017, now U.S.
SYSTEMS AND METHODS FOR ENABLING INTER-AGENT MULTICAST DOMAIN NAME SYSTEM CLIENT ROAMING IN WIDE AREA NETWORK

CROSS-REFERENCE TO RELATED APPLICATION

This application is a continuation of U.S. patent applicaPat. No. 10,659,319 which issued on May 19, 2020, the contents of which is incorporated by reference in its entirety.

TECHNICAL FIELD

The present technology pertains to zero-configuration networking and more specifically to wide area multicast domain name system in zero-configuration networking.

BACKGROUND

Zero-configuration networking automatically creates a usable computer network between networked devices (e.g., computers, printers, peripherals, etc.) based on the Transmission Control Protocol and Internet Protocol (TCP/IP). Zero-configuration networking includes service discovery, address assignment and hostname resolution. The networked devices can be automatically connected using multicast Domain Name Systems (mDNS).

The network can include agents for advertising (e.g., exporting) services offered by networked devices (e.g., display, music, printing, etc.) to a controller for facilitating connection by other networked devices (e.g., across a Wide Area Network (WAN)). The networked device (and accompanied services) can move within the local network (e.g., to a new agent). When a move occurs within in the same subnet (and stays with the same agent) the agent can, locally, take care of de-duplication of services and notify the controller accordingly. When a move occurs to a new agent (and subnet), the agent has no way of knowing the move occurred and in turn, cannot prevent de-duplication of services at the controller.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to implement roaming clients utilizing zero-configuration networking over a wide area network. Disclosed are systems, methods, and computer-readable storage media can include receiving, at a controller from a first agent, a request to advertise a service of a networked device and storing, at a database accessible by the controller, the service and associated records of the service. The systems, methods and computer-readable storage media can also include receiving, at the controller from a second agent, a request to advertise the service of the networked device and the associated records of the service and verifying, at the database, whether the service exists. In response to verifying the service exists in the database, comparing contents of the associated records received from the first agent and the associated records received from the second agent. In response to a conflict between the contents of the associated records received from the first agent and the associated records received from the second agent, updating the database with the associated records received from the second agent. The systems, methods and computer-readable storage media can also include receiving, at the controller, a request to use the service from a computing device, wherein the request includes at least one record from the associated records of the service provided by the first agent, looking up, at the database, the service and receiving, at the controller, a lookup failure.

In some examples, the associated records of the service require a predetermined number of records to be received by the controller. In some example, the predetermined number of records includes a name of the service, a service pointer type and a media access control address of the network device.

The systems, methods and computer-readable storage media can also include the request received from the second agent is generated based off the networked device moving to a different local network.

The systems, methods and computer-readable storage media can also include the first agent, the second agent and the controller are connected over a wide area network and the networked device, first agent and the second agent are connected over a local area network.

Description

Figure 1:
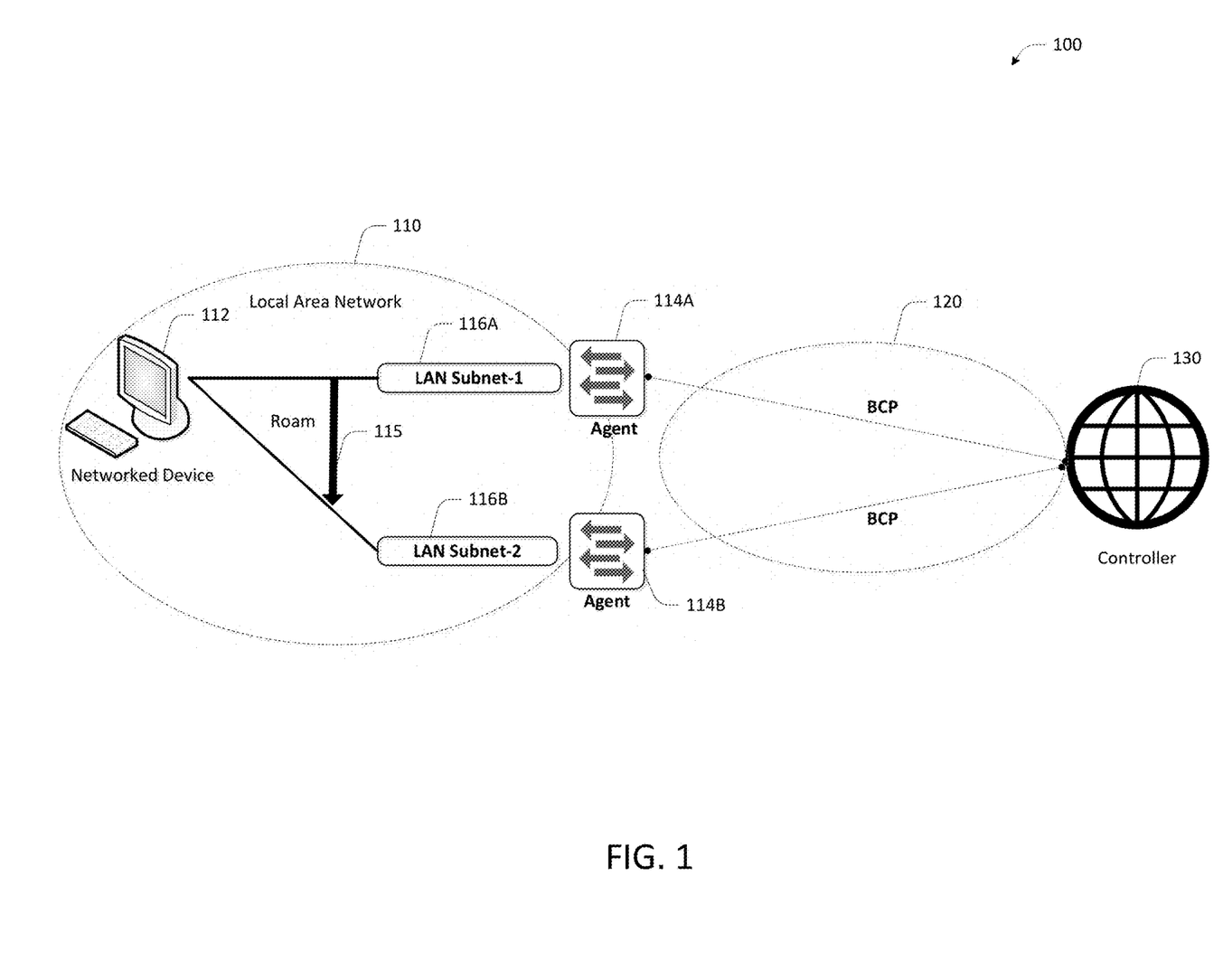
FIG. 1 illustrates a diagram of an example overview a roaming service.
Figure 2:
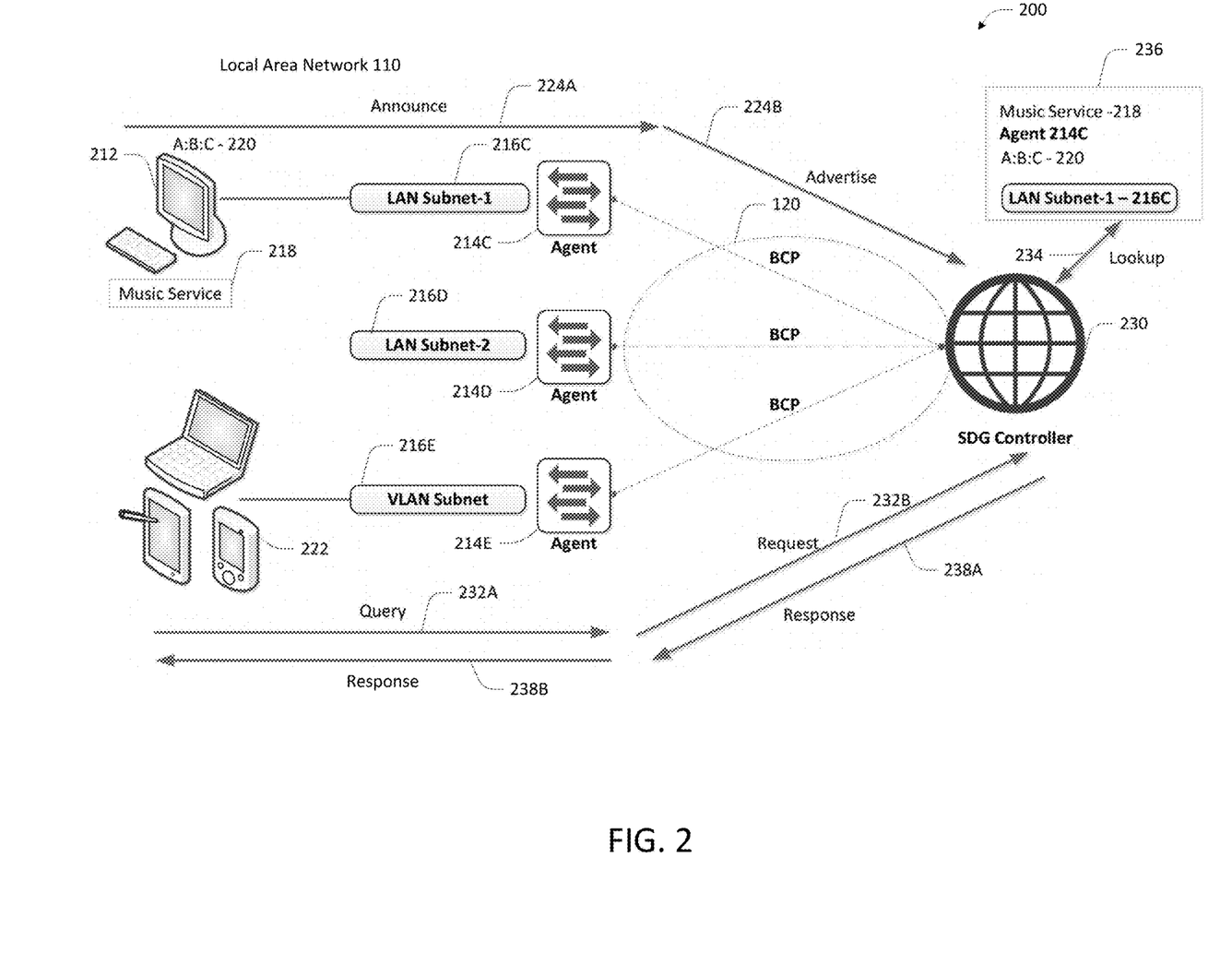
FIG. 2 illustrates a diagram of an example of a service before roaming.
Figure 3:
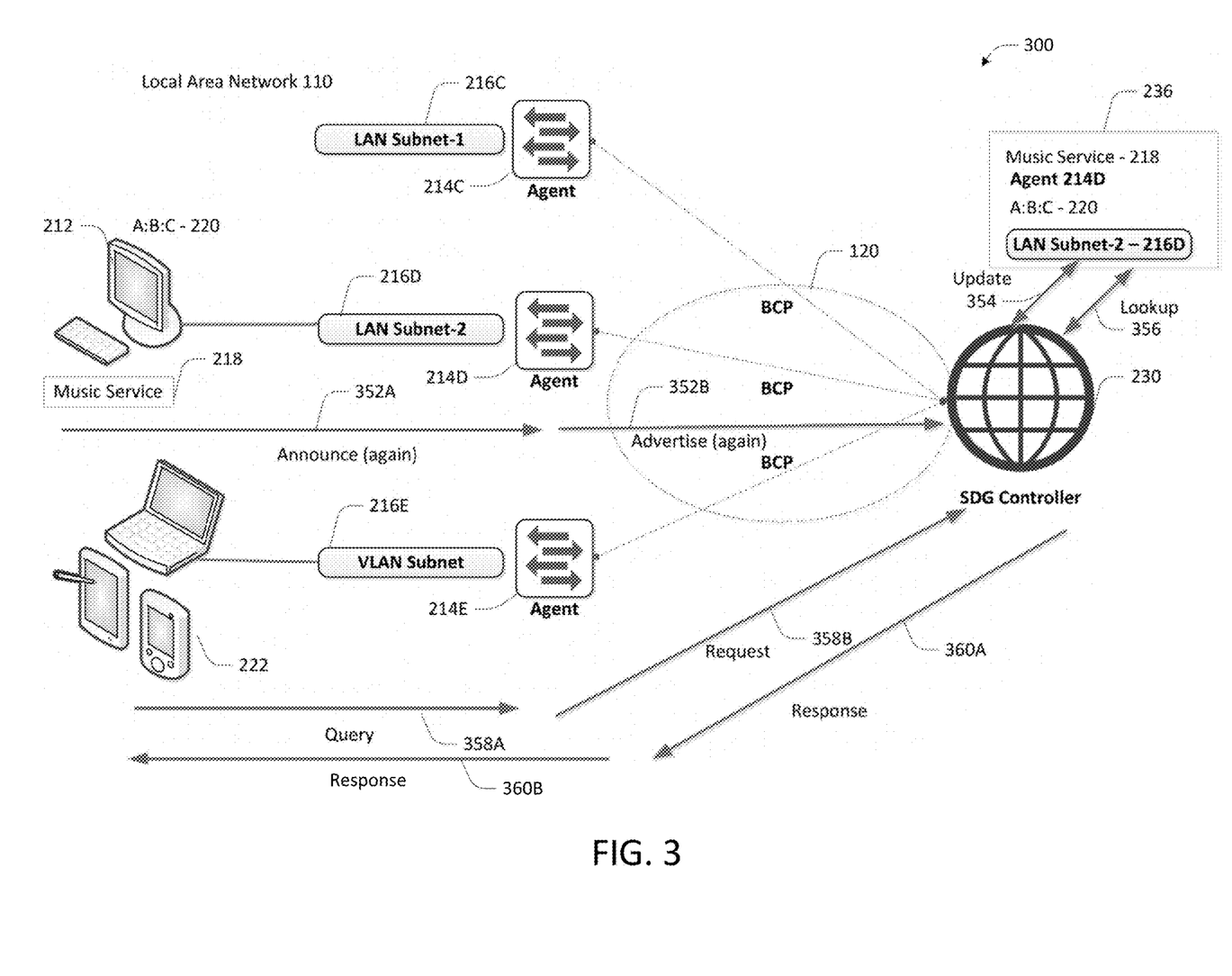
FIG. 3 illustrates a diagram of an example of a service after roaming.
Figure 5:
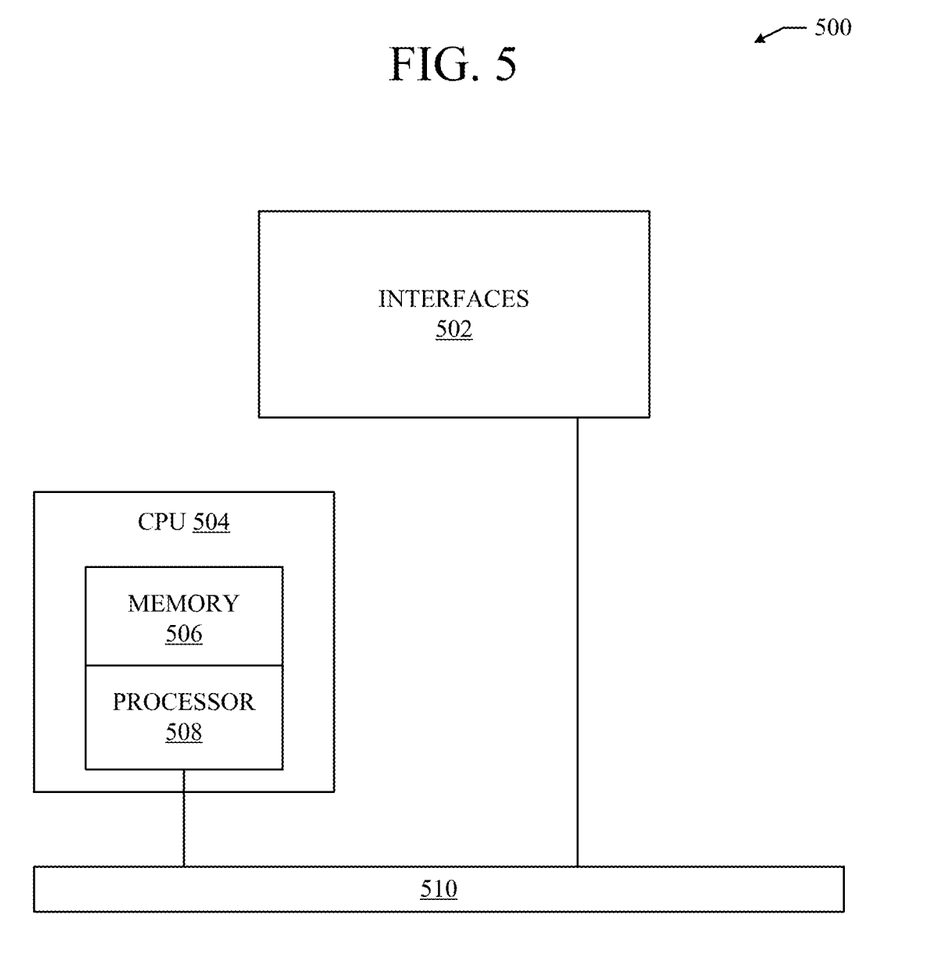
FIG. 5 illustrates an example network device.
Figure 6:
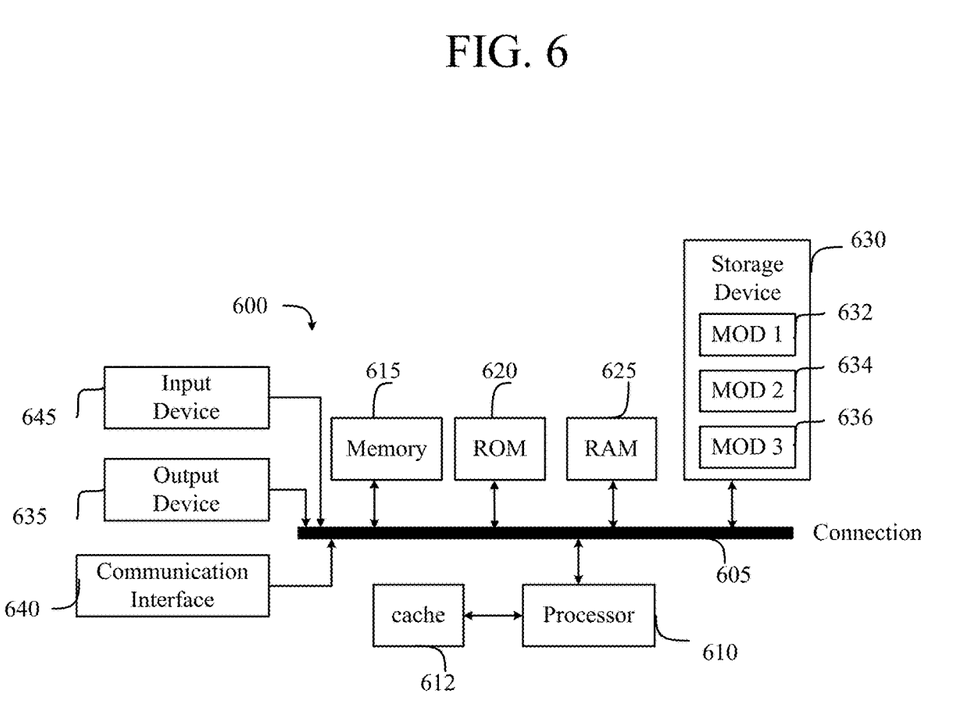
FIG. 6 illustrates example system embodiments.

The disclosed technology addresses the need in the art for service roaming in a zero-configuration network over a wide area network. Disclosed are systems, methods, and computer-readable storage media for implementing service roaming in a zero-configuration network over a wide area network by utilizing agents, application programming interfaces (API), and a controller. A description of client roaming in network computing environments and architectures, as illustrated in FIG. 1, is first disclosed herein. A discussion of service announcement, roaming, announcement (again) and a method thereof as illustrated in FIGS. 2-3 will then follow. The discussion then concludes with a description of example devices, as illustrated in FIGS. 5 and 6. These variations shall be described herein as the various embodiments are set forth. The disclosure now turns to FIG. 1.

FIG. 1 is a schematic block diagram of a roaming Networked Device 112 in a communication network 100 illustratively including Local Area Network (LAN) 110 and WAN 120. In FIG. 1, networks 110 and 120 can be automatically configured for communication between devices using a zero-configuration networking (e.g., Bonjour).

LAN 110 can include one or more networked devices (e.g., 112, etc.). The networked devices can offer one or more services to other networked devices (e.g., within LAN 110 or through WAN 120). Networked Device 112 can be connected to an Agent 114 (e.g., 114A, 114B, etc.) through one or more subnets 116 (e.g., LAN Subnet-1 116A, LAN Subnet-2 116B, etc.) to which the Agents 114 can announce the offered services (of Networked Device 112) to Controller 130. Controller 130 can then provide notifications of the offered services to network devices (which query for offered services). The offered services can be verified at periodic increments (e.g., via a heart beat message). When a heart beat in not received, the offered service can be terminated (e.g., at the controller). However, in some situations, the networked device (and offered service) can roam to another agent (e.g., 114B). When the networked device roams, the new agent (e.g., 114B) can announce the service (e.g., as a new service) to controller 130. Controller 130 can then have conflict of services. In some examples, roaming can occur between networks of the same type and/or networks of different types (e.g., LAN, wireless LAN, VLAN, etc.). In some examples, roaming occurs when only one network is active at a time, for example, a device roams between a hardwire connection (LAN) and wireless connection (WLAN) a roaming when the hardwire connection is disconnected and the wireless connection is connected.

In order to remedy the duplicate entries and conflicts, the agents can perform one or more checks before exporting the offered services of the networked device to the controller. For example, the agent can require a predetermined number of records from the networked device before exporting the offered service. The records can include, but are not limited to: Media Access Control address (MAC), Domain Name Pointer (PTR), Service Location (SRV), IPv4 Host (A), IPv6 Host (AAAA), Text (TXT), service name, etc. In some examples, when the offered service is received from an interface utilizing IPv4, the networked device offering that service should have a routable IPv4 address announced in "A" record. In some examples, when the offered service is received from an interface utilizing IPv6, the networked device offering that service should have a routable IPv6 address announced in "AAAA" record. In some examples, when the offered service is a dual stack (received from an interface that has an IPv4 and an IPv6 address), the IPv4 can be mandatory and the IPv6 can be optional. In some examples, the MAC address of the interface (e.g., at the networked device) can be present in the agent local forwarding table to export the offered service to the controller.

By requiring a predetermined number of records being received at the agent (and controller), the controller can better determine conflicts (e.g., duplications of offered services). In some examples, at a minimum the controller can require the name of the offered service, the service pointer type, and MAC address of the networked device offering the service.

FIG. 2 is a schematic block diagram of an example initial announcement and query 200 of offered services of Networked Device 212. Local Area Network 110 can have one or more Networked Devices 212, 222, etc. (e.g., servers, computing devices, printers, smart phones, networked components, televisions, endpoints, etc.). In this example, Networked Devices 212 can offer services (e.g., Music Service 218) and Networked Device 222 can receive services. Local Area Network 110 can have one or more subnets 216C, 216D, 216E (e.g., LAN subnet-1, LAN subnet-2, VLAN subnet, etc.) for facilitating a connection between the networked device and one or more agents 214C, 214D, 214E, etc. The one or more agents can communication with controller 230 over WAN 120 (e.g., via Bonjour Control Protocol, etc.).

In this example, Networked Device 212 can offer Music Service 218. Networked Device 212 can communication with Agent-214C via LAN Subnet-1 216C. Networked Devices 222 can connect to Agent 214E (or other agents) via VLAN Subnet 216E (or other subnets). When Networked Device 212 connects to Agent 214C (via LAN Subnet-1 216C), Networked Device 212 can Announce 224A to Agent 214C one or more offered services (the announcement can include MAC address 220, IP address, and service name). In this example, Networked Device 212 offers Music Service 218. Agent 214C can then advertise the announcement of Music Service 218 to Controller 230 (including MAC address 220, IP address, and service name). As discussed above, Agent 214C can wait to Advertise 224B the announcement until the predetermined number of records (e.g., parameters) have been received. In some examples, policies are configured between the Agent and the Controller (e.g., to facilitate communication over the different networks). Upon receipt of the advertised announcement, Controller 230 can cache the offered service (e.g., in a lookup table). For example, offered services can be stored in Database 236. In some examples, a heartbeat can be sent between the controller and agents to refresh the services that are offered (e.g., when a heartbeat is not received, a service can be considered stale and removed from the cache).

There can be at least three types of policies implemented in wide area zero configuration networking: local area agent policy, wide area agent policy and wide area controller policy. The local area agent policy can be enforced on the agent (e.g., gateway running agent) between the devices in the local network. The enforcement is in the layer 2 network domain and can be bi-directional. The local area agent policies can be enforced towards mDNS end-points in Layer 2 network domain. The local area agent policies can determine whether to permit or deny announcement and cache the service for further distribution. Similarly it can determines whether to listen request from another end-point to provide response. If permitted then an agent response can be based on local cache (e.g., at the agent). If denied, then the request can be denied. The wide area agent policy can be enforced on the agent for export control to the controller. The wide area agent policy can be uni-directional (egress) from the agent to the controller. This uni-directional policy is outbound towards the controller (e.g., central wide area bonjour naming server). The wide area agent policies can determine what locally discovered services are permitted/deny to be globally distributed thru the controller and what service request from local clients can be discovered from wide area network (e.g., wide area service SDG, Bonjour domain, etc.). The wide area controller policy can be enforced on the controller. The wide area controller policy can be enabled for global discovery and distribution to the agents and can be bi-directional.

Networked Devices 222 can query Agent 214E for offered services (e.g., services offered by networked devices in the one or more subnets connected to the one or more agents). For example, a networked device of the Networked Devices 222 can sent a Query 232A for offered services to Agent 214E. Agent 214E can Request 232B the query to Controller 230. In response to receiving the query, Controller 230 can Lookup 234 offered services from Database 236. Database 236 can be a database, table, flat file, server, or any other available lookup file or device for storing and locating data. Database 236 can include one or more parameters of the offered services, including, but not limited to: service name (e.g., Music Service 218), IP address (e.g., networked device offering the service), MAC address (e.g., networked device offering the service), etc. After receiving offered services, Controller 230 can then transmit Response 238A with the offered services (e.g., Music Service 218) to Agent 214E, which in turn can transmit Response 238B with the offered services to Networked Devices 222. The response (e.g., 238A, 238B) can include the parameters necessary for enabling a connection with the offered service (e.g., IP Address, service name, MAC address, etc.).

FIG. 3 is a schematic block diagram of an example roaming networked device, announcement (again) and query 300 of offered services of Networked Device 212. In some examples, Networked devices can roam to a different agent. For example, Networked Device 212 can roam from Agent 214C to Agent 214D. When Networked Device 212 roams to Agent 214D the connection within LAN 110 will be moved from LAN Subnet-1 216C to Local Area Network (LAN) Subnet-2 216D. In response to being connected to a new agent, Networked Device 212 can Announce 352A (e.g., announce again) offered services (e.g., Music Service 218) to new Agent 214D. Agent 214D can then Advertise 352B (e.g., advertise again) the announcement of the newly discovered offered services to Controller 230 (e.g., when the predetermined number of records are satisfied). Controller 230 can then Update 354 the offered service at Database 236. For example, the controller can use the parameters (received with the announcement) to first determine if an entry for the offered services exists (in Database 236). For example, the determination can be made if the Service Name (e.g., Music Service 218) and MAC Address (e.g., 220) of already advertised offered service exists in the database (e.g., 236). When the offered service exists and the agent is different, the controller can update Database 236 with the newly received information. For example, when the offered service exist (e.g., in Database 236) with a common Service Name (e.g., Music Service 218) and MAC Address (e.g., 220) then the controller (e.g., 230) considers the original announcing Networked Device (e.g., 212) to have roamed to a different Agent (e.g., to 214D from 214C) and is re-advertising the service from a new Agent (e.g., 214D). The controller can then replace the stale entry in Database 236 with the newly received information to globally distribute up-to-date source information (e.g., in real-time).

At a time subsequent the roam and update, Networked Devices 222 can Query 358A for offered services (e.g., Music Service 218). In some examples, the queries can occur at regular (e.g., predetermined) intervals to ensure the networked devices have the correct information. Request 358B is transmitted from Agent 214E to Controller 230 for new or updated offered services. Controller 230 can receive the request and perform Lookup 356 in Database 236. The lookup can include discovery of new offered services and updating previously discovered services. For example, Lookup 356 can determined Music Service 218 has roamed. In some examples, the determination can be made based on service name, MAC address and IP address. For example, Lookup 356 can determine the offered service (e.g., Music Service 218) has roamed based on the service name (e.g, Music Service 218) and MAC address (e.g., MAC address of Networked Device 212 will not change). Controller 230 can send updated information (via Response 360A) to Agent 214E (e.g., updated IP Address for enabling connection with Music Service 218). Agent 214E can then send (via Response 360B) the updated information (and any new offered services) to Networked Device 222 for local storage.

In some examples, implemented policies, as described above, can prohibit the updated information from being provided to Networked Devices 222. For example, a policy can exist for enabling connections between VLAN Subnet 216E and LAN Subnet-1 216C and can prohibit connections between VLAN Subnet 216E and LAN Subnet-2 216D. In that example, Lookup 356 will fail, as the service (e.g., Music Service 218) is no longer offered to Networked Device 222 (e.g., based on the policy).

Figure 4:
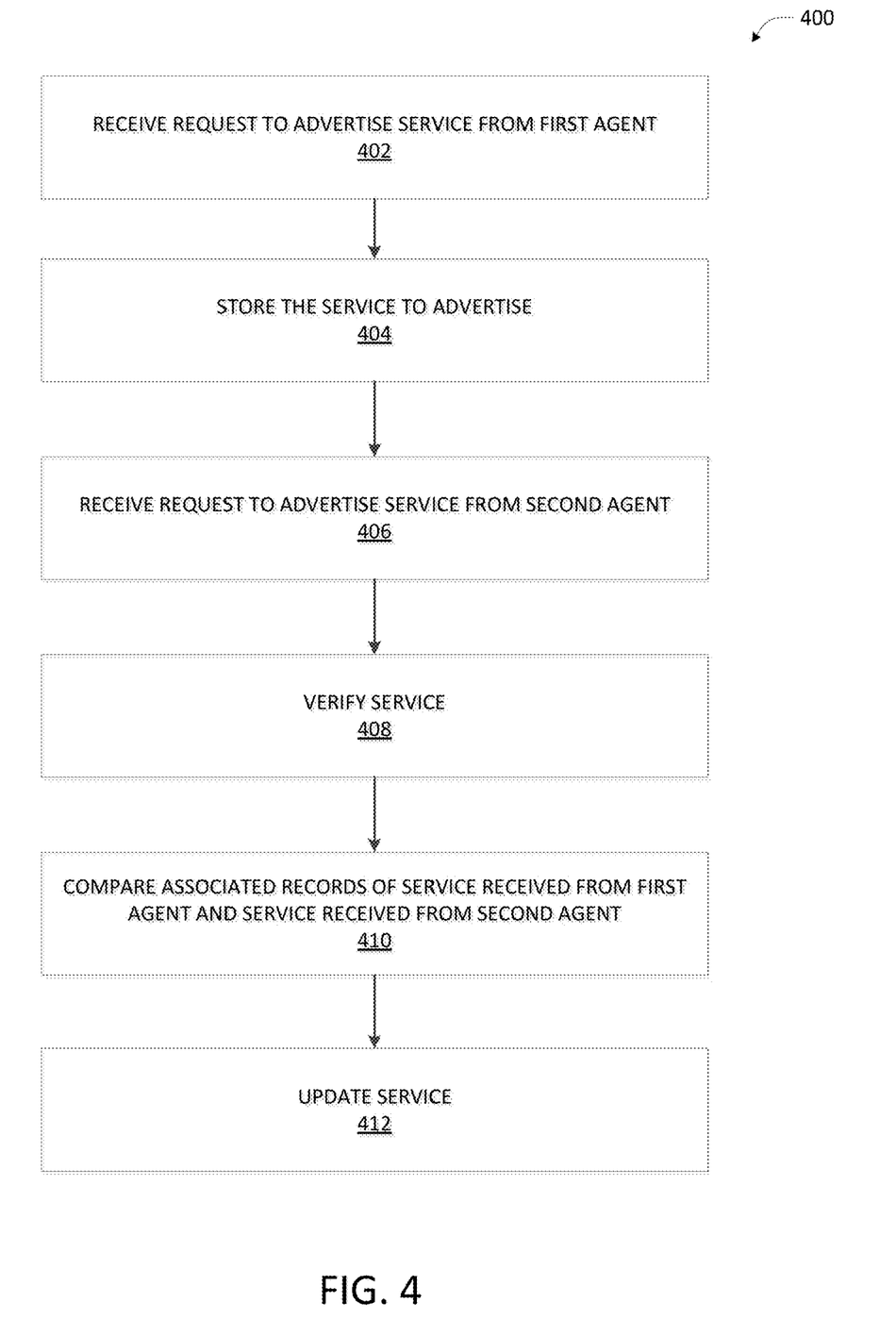
FIG. 4 illustrates a flow diagram of an example method of a roaming service.

The method shown in FIG. 4 is provided by way of example, as there are a variety of ways to carry out the method. Additionally, while the example method is illustrated with a particular order of blocks, those of ordinary skill in the art will appreciate that FIG. 4 and the blocks shown therein can be executed in any order that accomplishes the technical advantages of the present disclosure and can include fewer or more blocks than illustrated.

Each block shown in FIG. 4 represents one or more processes, methods or subroutines, carried out in the example method. The blocks shown in FIG. 4 can be implemented in a network environment as shown in FIGS. 2s and 3. The flow chart illustrated in FIG. 4 will be described in relation to and make reference to at least the elements in FIGS. 2 and 3.

FIG. 4 shows a flow diagram of an example method 400 for enabling inter-agent client roaming. Method 400 can begin at block 402. At block 402, a controller can receive a request to advertise a service from a first agent. For example, Controller 230 can receive from Agent 214C information on a service to be advertised (e.g., Music Service 218). In some examples, the information can be the name of service, service type and associated records of the service. In some examples, the first agent cannot transmit until a predetermined number of records of the service have been provided by the networked device announcing the service. In some examples, the controller will not advertise the service unless a predetermined number of records of the service have been received. At block 404, the controller can store the service to be advertised in a database. For example, Controller 230 can store the service and any associated records of the service in Database 236. The associated information can include agent (e.g., 214, etc.), service name (Music Service 218, etc.), network (e.g., 216, etc.), MAC address (e.g., 220, etc.), PTR, and any other information associated with the service.

At block 406, the controller can receive a request to advertise the service from a second agent. For example, Controller 230 can receive from Agent 214D information on the service to be advertised (e.g., Music Service 218). In this example, the service is the same at in block 402, however, the records associated with the service has changed (e.g., agent). For example, Network Device 212 has "roamed" to LAN 216D from LAN 216C. By roaming, Music Service 218, from zero configuration networking purposes, connects to Agent 214D and not Agent 214C to which it was previously advertised. This can cause issues for other networked devices (e.g., 222) that have not refreshed the service list. For example, Networked Devices 222 can request Music Service 218 though Agent 218C, where it is no longer connected, causing an error.

At block 408, the controller can verify the service. For example, Controller 230 can determine if Music Service 218 exists in Database 236 and if the associated information is the present. At block 410, the controller can compare the associated records of the service (e.g., from the first agent and second agent). In some examples, Controller 230 can determine the associated records of the service stored in Database 236 and the recently received associated records of the service have different agents (214C and 214D) by the MAC address and service name. For example, Controller 230 can use the received records (e.g., MAC address 220 and service name 218) from Agent 214D to determine if the offered service exists in the database. The controller can determine the offered service (e.g., Music Service 218) exists and was previously associate with Agent 214C. Accordingly, Controller 230 can update Database 236 to reflect the Agent 214D and LAN Subnet-2 214D. Since there is a conflict, the service can currently be unavailable.

At block 410, the controller can update the service. For example, Controller 230 can update Database 236 with the new associated records (e.g., new agent, IP address, etc.). Upon receiving a new request for offered services, the controller can transmit a response to refresh the previously queried offered services (e.g., query the controller).

The disclosure now turns to the example network device and system illustrated in FIGS. 5 and 6.

FIG. 5 illustrates an example network device 500 suitable for routing, switching, forwarding, traffic management, and load balancing. Network device 500 can be, for example, a router, a switch, a controller, a server, a gateway, and/or any other L2 and/or L3 device.

Network device 500 can include a master central processing unit (CPU) 504, interfaces 502, and a bus 510 (e.g., a PCI bus). When acting under the control of appropriate software or firmware, the CPU 504 is responsible for executing packet management, error detection, load balancing operations, and/or routing functions. The CPU 504 can accomplish all these functions under the control of software including an operating system and any appropriate applications software. CPU 504 may include one or more processors 508, such as a processor from the Motorola family of microprocessors or the MIPS family of microprocessors. In an alternative embodiment, processor 508 is specially designed hardware for controlling the operations of network device 510. In a specific embodiment, a memory 506 (such as non-volatile RAM and/or ROM) also forms part of CPU 504. However, there are many different ways in which memory could be coupled to the system.

The interfaces 502 are typically provided as interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 504 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 6 shows an example of computing system 600 in which the components of the system are in communication with each other using connection 605. Connection 605 can be a physical connection via a bus, or a direct connection into processor 610, such as in a chipset or system-on-chip architecture. Connection 605 can also be a virtual connection, networked connection, or logical connection.

In some embodiments computing system 600 is a distributed system in which the functions described in this disclosure can be distributed within a datacenter, multiple datacenters, a peer network, throughout layers of a fog network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, read only memory (ROM) 620 or random access memory (RAM) 625 to processor 610. Computing system 600 can include a cache of high-speed memory 66 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output, and also connect computing system 600 to other nodes in a network. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, battery backed random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

Examples described above with reference to the accompanying figures provide an improvement to one or more aspects of existing methods and systems to implement roaming clients utilizing zero-configuration networking over a wide area network. Parameters associated with a service offered in the technological field of zero-configuration networking over a wide area network are critical to the operation and connection to the offered services. Therefore, it is important the controller has accurate, real-time parameters for the services offered and for the controller to determine when a service has roamed from one network to another, along with how the networked devices should be updated. Such roaming can hinder the ability for network devices to connect (via zero-configuration networking) to the offered service, since incorrect connection parameters (e.g., after the service has roamed), along with policies associated with the networks might not enable a network device to connect to the network to which the service has roamed. The controller, by handling new parameters for the same service improves the performance of the underlying networked devices and offered services running thereon, as well as the technological field of zero-configuration networking over a wide area network For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method comprising:
   receiving at least one request to advertise a service of a network device in a network environment that is received from the network device in response to the network device roaming to a new subnet in the network environment;
   determining whether information associated with the service exists for the new subnet in a database of services in the network environment;
   when the information is determined to exist in the database, determining whether a conflict exists between the information and the at least one request; and
   when the conflict is determined to exist, updating the database based on the at least one request.

2. The method of claim 1, further comprising:
   storing, at the database, the service and associated records of the service.

3. The method of claim 2, wherein the associated records of the service require a predetermined number of records to be received by a controller.

4. The method of claim 3, wherein the predetermined number of records includes a name of the service, a service pointer type and a media access control address of the network device.

5. The method of claim 1, further comprising:
   receiving another request to advertise the service.

6. The method of claim 5, wherein the another request is received from the network device.

7. The method of claim 5, wherein the another request is generated based off the networked device moving to a different local network.

8. A system comprising:
   a processor; and
   a memory configured to store instructions which, when executed by the processor, cause the processor to:
      receive at least one request to advertise a service of a network device in a network environment that is received from the network device in response to the network device roaming to a new subnet in the network environment;
      determine whether information associated with the service exists in a database of services in the network environment;
      when the information is determined to exist in the database, determine whether a conflict exists between the information and the at least one request; and
      when the conflict is determined to exist, update the database based on the at least one request.

9. The system of claim 8, comprising further instructions, which when executed by the processor, cause the processor to store, at the database, the service and associated records of the service.

10. The system of claim 9, wherein the associated records of the service require a predetermined number of records to be received by a controller.

11. The system of claim 10, wherein the predetermined number of records includes a name of the service, a service pointer type and a media access control address of the network device.

12. The system of claim 8, comprising further instructions, which when executed by the processor, cause the processor to receive another request to advertise the service.

13. The system of claim 12, wherein the another request is received from the networked device.

14. The system of claim 12, wherein the another request is generated based off the networked device moving to a different local network.

15. A non-transitory computer readable medium storing instructions, which when executed by a processor, causes the processor to:
   receive at least one request to advertise a service of a network device in a network environment that is received from the network device in response to the network device roaming to a new subnet in the network environment;
   determine whether information associated with the service exists in a database of services in the network environment;
   when the information is determined to exist in the database, determine whether a conflict exists between the information and the at least one request; and
   when the conflict is determined to exist, update the database based on the at least one request.

16. The non-transitory computer readable medium of claim 15, comprising further instructions, which when executed by the processor, cause the processor to store, at the database, the service and associated records of the service.

17. The non-transitory computer readable medium of claim 16, wherein the associated records of the service require a predetermined number of records to be received by a controller.

18. The non-transitory computer readable medium of claim 17, wherein the predetermined number of records includes a name of the service, a service pointer type and a media access control address of the network device.

19. The non-transitory computer readable medium of claim 15, comprising further instructions, which when executed by the processor, cause the processor to receive another request to advertise the service.

20. The non-transitory computer readable medium of claim 19,
wherein, the another request is generated based off the networked device moving to a different local network.

* * * * *